United States Patent
Gupta et al.

(10) Patent No.: US 11,049,152 B2
(45) Date of Patent: Jun. 29, 2021

(54) SYSTEM AND METHOD FOR DYNAMICALLY CREATING AND PUBLISHING REVIEWS

(71) Applicants: Gaurang Gupta, Bangalore (IN); Anupam Mediratta, Bangalore (IN)

(72) Inventors: Gaurang Gupta, Bangalore (IN); Anupam Mediratta, Bangalore (IN)

(73) Assignees: Gaurang Gupta, Bangalore (IN); Anupam Madiratta, Bangalore (IN)

( * ) Notice: Subject to any disclaimer, the term of this patent is extended or adjusted under 35 U.S.C. 154(b) by 607 days.

(21) Appl. No.: 15/602,799

(22) Filed: May 23, 2017

(65) Prior Publication Data
US 2017/0345066 A1 Nov. 30, 2017

(30) Foreign Application Priority Data
May 24, 2016 (IN) .............................. 201641017869

(51) Int. Cl.
*G06Q 30/00* (2012.01)
*G06Q 30/02* (2012.01)
*H04W 4/029* (2018.01)

(52) U.S. Cl.
CPC ......... *G06Q 30/0282* (2013.01); *H04W 4/029* (2018.02)

(58) Field of Classification Search
USPC ....................................................... 705/347
See application file for complete search history.

(56) References Cited

U.S. PATENT DOCUMENTS

| 2015/0195295 A1* | 7/2015 | Sandler | G06F 16/951 726/26 |
| 2016/0105435 A1* | 4/2016 | Turner | H04L 63/107 726/7 |
| 2016/0267500 A1* | 9/2016 | Jackson | G06F 16/248 |

FOREIGN PATENT DOCUMENTS

EP 1855245 A1 * 11/2007 ............. G06Q 30/02

OTHER PUBLICATIONS

Askalidis, Georgios Understanding and Overcoming Biases in Customer Reviews, Cornell University, 2016arXiv160400417, dated Apr. 5, 2016 (Year: 2016).*

* cited by examiner

*Primary Examiner* — Michael Young
(74) *Attorney, Agent, or Firm* — Barry Choobin; Patent 360LLC

(57) ABSTRACT

The embodiments herein provide a system and method for creating and publishing reviews for the determined location. The method includes identifying a user location using location services, requesting the user to review the identified location, receiving the review about the identified location in a chat-based interface, displaying the contextually relevant content in the chat-based interface, receiving the updated review request and publishing the review on the review creation and publication platform.

12 Claims, 3 Drawing Sheets

SYSTEM AND METHOD FOR DYNAMICALLY CREATING AND PUBLISHING REVIEWS

CROSS-REFERENCE TO RELATED APPLICATION

The embodiments herein claim the priority of the India Provisional Application with Serial Number 201641017869 filed on May 24, 2016, with the title, "A SYSTEM AND METHOD FOR CREATING AND PUBLISHING REVIEWS", and the contents of which is included entirely as reference herein.

BACKGROUND

Technical Field

The embodiments herein are generally related to a field of review creation and publishing. The embodiments herein are particularly related to a system and method for creation and publishing of reviews digitally. The embodiments herein are more particularly related to a digital platform for enabling review creation and publication.

Description of like Related Art

A consumer review is a critical evaluation of a product or a service based on a personal experience, which is generally published or broadcasted in multimedia for helping other consumers to make decisions on the product, or the service offered.

The consumer reviews of the products and the services are a popular source of information for the other consumers in making the purchasing decisions. The consumer reviews play a significant role, especially in the hospitality services such as travel-related services for selecting or rejecting the service like booking hotels. There are a plurality of review publishing websites such as the TripAdvisor™, the Oyster™, the TripExpert™, etc., that publishes the reviews from the users as well as from the professional reviewers.

The users mostly create and publish reviews on the review platforms after completing their stay. Further, the reviews written are dependent on the purpose of the stay, and the amenities enjoyed by the user. The user might forget to review about some amenities provided by the hotels.

Further, the currently available review platforms or feedback taking websites are static and do not provide changes m review dynamically. The conventional review platforms or the feedback taking websites provide the same reviewing pane for all users or provide the same form to every reviewer. They fail to seize and understand the inputs provided by the reviewer in real-time. For example, when the reviewer provides a feedback that he is on a business trip, or on a family vacation, the review format questions are not changed accordingly or dynamically. Further, the feedback questions filled to the reviewer remains static and are in standard format only.

The presently available feedback taking websites do not provide the option for questioning the rationale for the feedback or review provided by the user dynamically and in real-time based on the inputs provided by the user. For example, when the user provides a review that that he does not enjoy the restaurant, then the presently available systems does not dynamically query to find out what the user did not like in the restaurant such as food, servicing, furniture, hygienic conditions, etc.

Hence, there is a need fore method and system that enable the users to review the services, infrastructure, facilities and amenities in a hotel dynamically. Further, there is a need for a method and system that intelligently and contextually queries the user regarding the reviews posted with respect to the amenities provided by the hotel.

The above mentioned shortcomings, disadvantages and problems are addressed herein and which will be understood by reading and studying the following specification.

OBJECTS OF THE EMBODIMENTS

The primary object of the embodiments herein is to provide a dynamic system and method for creating and publishing reviews.

Another object of the embodiments herein is to provide a conversational system and method for creating user reviews.

Yet another object of the embodiments herein is to query the user with contextual questions, based on the reviews created by other users.

Yet another object of the embodiments herein is to enquire the user with follow-up questions based on the review created by the user.

Yet another object of the embodiments herein is to allow the user to create and publish a review in any one of the multimedia formats, viz. text, image, audio, and video.

Yet another object of the embodiments herein is to allow users to publish the review in a standard review format (paragraphs, images, and videos) for ease of consumption, even though the review is originally created in a conversational format.

These and other objects and advantages of the embodiments herein will become readily apparent from the following detailed description taken in conjunction with the accompanying drawings.

SUMMARY

These and other aspects of the embodiments herein will he better appreciated and understood when considered in conjunction with the following description and the accompanying drawings. It should be understood, however, that the following descriptions, while indicating preferred embodiments and numerous specific details thereof are given by way of illustration and not of limitation. Many changes and modifications may be made within the scope of the embodiments herein without departing from the spirit thereof, and the embodiments herein include all such modifications.

The various embodiments herein provide an interactive system for creating and publishing reviews about a location. The system comprises an application server configured for enabling one or more users to create and publish one or more reviews about the location. The application server is communicatively coupled with a plurality of computing devices of the one or more users. The plurality of computing devices of the one or more users are configured for detecting real time geographical coordinates of a user location and for transmitting the detected real time geographical coordinates to the application server. The application server comprises a registration module configured for registering the one or more users with the system using one or more personal details provided by the user. A review creation module is configured for enabling each user to create one or more reviews in a plurality of multimedia formats. The review creation module is further configured for providing an interactive chat based interface on the computing device of the user for creation of the one or more reviews. The application server also comprises a review analysis module configured for analyzing the one or more reviews created by the user using one or more analysis techniques based on a plurality of pre-determined parameters. The review analysis module is further configured for providing a real time contextually relevant content to the user based on a plurality of pre-determined trips and the location of the user. The contextually relevant content is provided using the interactive chat-based interface upon analysis of the initial review provided by the user. The application server further comprises a review publishing module configured for publishing a consolidated/compiled review after combining one or more reviews provided by the user and after accommodating all the changes based on the analysis performed by the review analysis module.

According to an embodiment herein, the plurality of pre-determined parameters considered by the review analysis module for analyzing the one or more reviews created by the user comprise a plurality of previous reviews of a selected location, specific detail-oriented reviews about the selected location, the length of the review, emotion factor and quality of the review.

According to an embodiment herein, the plurality of trips considered by the review analysis module for providing real time contextually relevant content comprise a business trip, a personal trip, a family trip and a romantic trip.

According to an embodiment herein, the computing device of the user is further configured for determining the real time location of the use using one or more location determination systems.

According to an embodiment herein, the application server is further configured for pushing a notification to the user requesting to review the selected location on receiving real time geographical coordinates of the user location from the computing device. The user is provided with an option to accept or decline the review request. The interactive chat based interface is launched on the computing device of the user for providing review on accepting the request to review the determined location.

According to an embodiment herein, the application server is further configured for pushing the notification request on the computing device of the user to review the location after a predetermined delay from the time the geographical coordinates of the user location are received.

According to an embodiment herein, the system is further configured for enabling the one or more users to review same location for a plurality of times.

According to an embodiment herein, the review analysis module is further configured for providing an option to the user to accept or decline the real time contextually relevant content presented using the interactive chat-based interface for improving the one or more reviews. The initial review created by the user is marked as a final review and is published when the user declines the presented real time contextually relevant content.

According to an embodiment herein, the system is further configured for enabling the one or more users to modify the published review at a later stage.

According to an embodiment herein, the review publishing module is further configured for publishing the consolidated/compiled review in a single multimedia format or in a plurality of multimedia formats such as text, audio and video.

According to an embodiment herein, the one or more techniques used by the review analysis module for analyzing the one or more reviews provided by the user comprise machine learning algorithm, artificial intelligence algorithm, sentiment analysis, contextual analysis, location-based analysis and behavioral analysis.

According to an embodiment herein, the review analysis module is further configured for directing the user provided reviews to a concerned personnel for analysis when the one or more techniques provided by the review analysis module are insufficient to analyze the reviews.

According to an embodiment herein, the real time contextually relevant content comprises a suggestion, a specific question, a follow-up question, an improvement, a request for sharing additional details about any specific topic mentioned in the initial review based on the created initial review and an option to include further details in the review or to finalize the review.

According to an embodiment herein, the system is further configured for providing a browser application, a mobile application or a software package hosted on the computing device of the user for creating and publishing one or more reviews about the location.

According to an embodiment herein, a method for creating and publishing reviews about a location is provided. The method comprises the steps of registering one or more users with the system through a registration module using one or more personal details provided by the user. The method further comprises detecting real time geographical coordinates of the user location and transmitting the detected real time geographical coordinates to an application server. A notification is pushed on the computing device of the user by using the application server for requesting the user to review the selected location. The user is enabled to create one or more reviews in a plurality of multimedia formats by providing an interactive chat based interface on the computing device of the user for creation of one or more reviews using a review creation module. The one or more reviews created by the user are analyzed based on a plurality of pre-determined parameters using one or more analysis techniques through a review analysis module. A real time contextually relevant content is provided to the user based on a plurality trips or the location using the interactive chat-based interface for improving the one or more reviews based on the analysis of the initial review provided by the user. A consolidated compiled review is published using a review publishing module after combining one or more reviews, provided by the user and after accommodating all die changes based on the analysis performed by the review analysis module.

According to an embodiment herein, the method further comprises providing an option to the user to accept or decline the notification regarding review request and launching the interactive chat-based interface on the computing device of the user for providing review on accepting the request to review the determined location.

According to an embodiment herein, the method further comprises providing an option to the user to accept or decline the real time contextually relevant content presented using the interactive chat-based interface for improving the one or more reviews.

According to an embodiment herein, the method further comprises publishing the consolidated/compiled review in a single multimedia format or a combination of plurality of multimedia formats such as text, audio and video.

According to an embodiment herein, the method further comprises allowing the one or more users to review same location for a plurality of times.

The foregoing description of the specific embodiments will so fully reveal the general nature of the, embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended.

BRIEF DESCRIPTION OF THE DRAWINGS

The other objects, features and advantages will occur to those skilled in the art from the following description of the preferred embodiment and the accompanying drawings in which.

Figure 1:
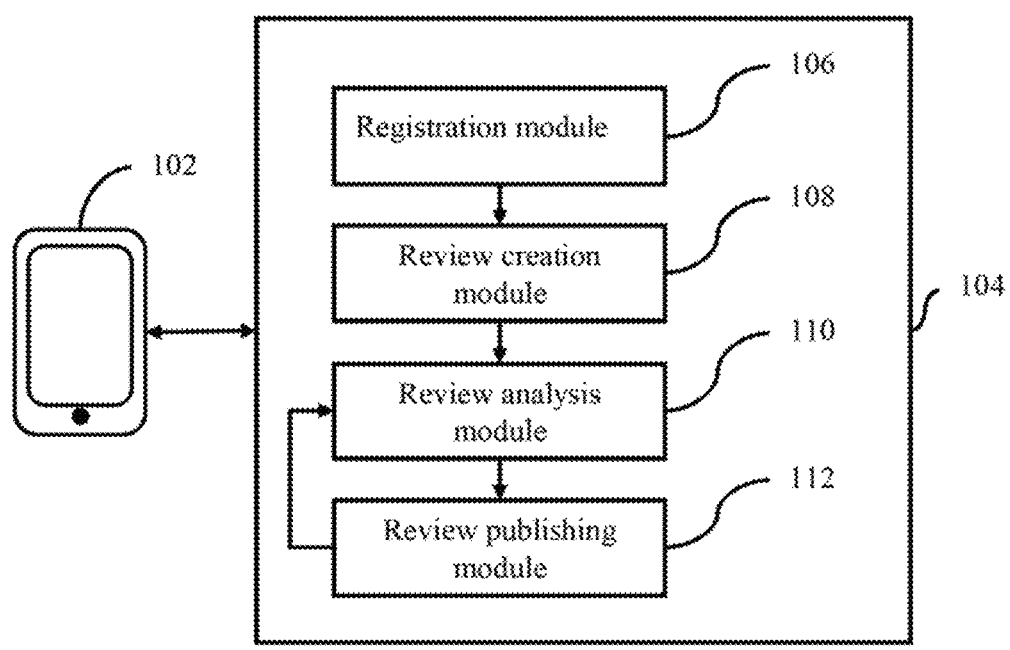
FIG. 1 illustrates a block diagram of a system for a review creation and publishing platform, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide an interactive system for creating, and publishing reviews about a location. The system comprises an application server configured for enabling one or more users to create and publish one or more reviews about the location. The application server is communicatively coupled with a plurality of computing devices of the one or more users. The plurality of computing devices of the erne or more users are configured for detecting real time geographical coordinates of a user location and for transmitting the detected real time geographical coordinates to the application server. The application server comprises a registration module configured for registering the one or more users with the system using one or more personal details provided by the user. A review creation module is configured for enabling each user to create one or more reviews in a plurality of multimedia formats. The review creation module is further configured for providing an interactive chat based interface on the computing device of the user for creation of the one or more reviews. The application server also comprises a review analysis module configured for analyzing the one or more reviews created by the user using one or more analysis techniques based on a plurality of pre-determined parameters. The review analysis module is further configured for providing a real time contextually relevant content to the user based on a plurality of trips and the location of the user. The contextually relevant content is provided using the interactive chat-based interface upon analysis of the initial review provided by the user. The application server further comprises a review publishing module configured for publishing a consolidated/compiled review after combining one or more reviews provided by the user and after accommodating all the changes based on the analysis performed by the review analysis module.

According to an embodiment herein, the plurality of pre-determined parameters considered by the review analysis module for analyzing the one or more reviews created by the user comprise a plurality of previous reviews of a selected location, specific detail-oriented reviews about the selected location, the length of the review, emotion factor and quality of the review.

According to an embodiment herein, the plurality of trips considered by the review analysis module for providing real time contextually relevant content comprise business trip, a personal trip, a family trip and a romantic trip.

According to an embodiment herein, the computing device of the user is further configured for determining the real time location of the user using one or more location determination systems.

According to an embodiment herein, the application server is further configured for pushing a notification to the user requesting to review the selected location on receiving real time geographical coordinates of the user location from the computing device. The user is provided with an option to accept or decline the review request. The interactive chat based interface is launched on the computing device of the user for providing review on accepting the request to review the determined location.

According to an embodiment herein, the application server is further configured for pushing the notification request on the computing device of the user to review the location after a predetermined delay from the time the geographical coordinates of the user location are received.

According to an embodiment herein, the system is further configured for enabling the one or more users to review same location for a plurality of times.

According to an embodiment herein, the review analysis module is further configured for providing an option to the user to accept or decline the real time contextually relevant content presented using the interactive chat-based interface for improving the one or more reviews. The initial review created by the user is marked as a final review and is published when the user declines the presented real time contextually relevant content.

According to an embodiment herein, the system is further configured for enabling the one or more users to modify the published review at a later stage.

According to an embodiment herein the review publishing module is further configured for publishing the consolidated: compiled review in a single multimedia format or in a plurality of multimedia formats such as text, audio and video.

According to an embodiment herein, the one or more techniques used by the review analysis module for analyzing the one or more reviews provided by the user comprise machine learning algorithm, artificial intelligence algorithm, sentiment analysis, contextual analysis, location-based analysis and behavioral analysis.

According to an embodiment herein, the review analysis module is further configured for directing the user provided reviews to a concerned personnel for analysis when the one or more techniques provided by the review analysis module are insufficient to analyze the reviews.

According to an embodiment herein, the real time contextually relevant content comprises a suggestion, a specific question, a follow-up question, an improvement, a request for sharing additional details about any specific topic mentioned in the initial review based on the created initial review and an option to include further details in the review or to finalize the review.

According to an embodiment herein, the system is further configured for providing a browser application, a mobile application or a software package hosted on the computing device of the user for creating and publishing one or more reviews about the location.

According to an embodiment herein, a method for creating and publishing reviews about a location is provided. The method comprises the steps of registering one or more users with the system through a registration module using one or more personal details provided by the user. The method further comprises detecting real time geographical coordinates of the user location and transmitting the detected real time geographical coordinates to an application server. A notification is pushed on the computing device of the user by using the application server for requesting the user to review the selected location. The user is enabled to create one or more reviews in a plurality of multimedia formats by providing an interactive chat based interface on the computing device of the user for creation of one or more reviews using a review creation module. The one or more reviews created by the user are analyzed based on a plurality of pre-determined parameters using one or more analysis techniques through a review analysis module. A real time contextually relevant content is provided to the user based on a plurality of trips or the location using the interactive chat-based interface for improving the one or more reviews based on the analysis of the initial review provided by the user. A consolidated/compiled review is published using a review publishing module after combining one or more reviews provided by the user and after accommodating all the changes based on the analysis performed by the review analysis module.

According to an embodiment herein, the method further comprises providing an option to the user to accept or decline the notification regarding review request and launching the interactive chat-based interface on the computing device of the user for providing review on accepting the request to review the determined location.

According to an embodiment herein, the method further comprises providing an option to the user to accept or decline the real time contextually relevant content presented using the interactive chat-based interface for improving the one or more reviews, According to an embodiment herein, the method further comprises publishing the consolidated/compiled review in a single multimedia format or a combination of plurality of multimedia formats such as text, audio and video.

According to an embodiment herein, the method further comprises allowing the one or more users to review same location for a plurality of times.

FIG. 1 illustrates a block diagram of a system for a review creation and publishing platform, according to one embodiment herein. The block diagram comprises a computing device 102 and an application server 104. The user of the computing device 102 is connected to the application server 104 to create and publish reviews. The examples of the computing device 102 include, but are not limited to a mobile phone, a smartphone, a wearable device, a laptop, a desktop, and the like. The user of the computing device 102 communicates with the application server 104 through a communication network (not shown in the figure). The examples of the communication network include, but are not limited to the Internet, an intranet, a radio frequency network, a telephone network, a satellite network, and the like.

The computing device 102 determines the location of the user and transmits the location to the user. The application server 104 pushes a request to review about the location. The examples of the location include, but are not limited to hotels, restaurants, theatres, event places, and the like. Further, the application server 104 pushes the user to review the specific details in the determined location, such as pools, parking space, lobby, rooms, and the like. After the user accepts the request for reviewing the location, the computing device 102 analyses the review created by the user and queries the user with a contextually relevant content. The contextually relevant content presented to the user is based on the determined location and the review created by the other users.

The user of the computing device 102 creates and publishes the reviews about a location such as a hotel, or a resort by downloading a mobile application provided by the application server 104. According to one embodiment herein, the user of the computing device 102 creates and publishes the reviews about the location by accessing the application server 104 through a browser application enabled using a communication network. According to another embodiment herein, the user of the computing device 102 creates and publishes the reviews about a place by accessing the application server 104 through a software package.

The application server 104 includes a registration module 106, a review creation module 106, a review analysis module 108, and a review-publishing module 110. The registration module 106 is configured to, register the user to the review creation and publishing platform. The user has to provide a plurality of details while registering to the review creation and publishing platform. The information provided by the user is stored in the registration module 106. The information received from the user by the laser registration module 106 include, but are not limited to a user name, a user email id, a user contact address, a user location, a user phone number, user preferences, and the like.

The review creation module 108 is configured to enable the user to create reviews in a plurality of formats. The review creation module 108 allows the user to create the review in any of the multimedia formats. The examples of the multimedia format in which the user creates the reviews include, but are not limited to text, audio, video, or a combination of thereof. The review creation module 108 enables the user to create the review in a chat-based interface.

The interactive chat-based interface provides a more human like way of taking a review by having a conversation around the experience of the user as compared to current review taking tools which are static in nature. The interactive manner of the chat-based interface helps in making the whole process conversational and thus the user feels more engaged in the process.

Once the user of the computing device 102 accepts the review creation request from the application server 104, a chat-based interface is launched and activated to enable the user to create the reviews of the determined location. Once the user creates an initial review about the application server 103 determined location, the review analysis module 110 receives the initial review.

The review analysis module 110 analyzes the initial review created by the user based on a plurality of predetermined parameters and provides a relevant content to the user in the chat-based interface. The examples of the predetermined parameters for analysing the initial review created by the user include, but are not limited to previous reviews of the determined location, specific detail-oriented reviews about the determined location, the length of the review, emotion factor, quality of the review, and the like.

The review analysis module 110, analyses the review created using standard analysis methods such as machine learning, artificial intelligence, sentiment analysis, contextual analysis, location-based analysis, behavioural analysis, and the like. The review analysis module 110 directs the analysis to concerned personnel when the analysis cannot be obtained through automation.

Once the initial review created by the user is analysed, the review analysis module 110 presents the user with the contextually relevant content. The contextually relevant content is presented to the user in the form of a chat-based interface. The contextually relevant content can be a suggestion, specific question, improvement, and the like. The contextually relevant content is a suggestion to improve the review created by the user, which is based on the predetermined analysis. The contextually relevant content is a specific question asked to the user based on the created initial review.

Further, the contextually relevant content can be a request to the user to provide more information. For example, when the user reviews about a restaurant, the contextually relevant content presented to the user can be "Many people have reviewed about the pool. How did you find it?", "It looks like you have not included the free parking provided by the restaurant aspect in your review, do you want to review about the parking space?", "Based on your review, we found that you were not happy with the Mexican food served you, do want concerned personnel to be notified about this?", and the like.

According to one embodiment herein, the review analysis module 110 is further configured for providing a real time contextually relevant content to the user based on a plurality of trips and the location of the user. The real time contextually relevant content is provided to the user using the interactive chat-based interface after analysis of the initial review provided by the user. The plurality of trips considered by the review analysis module for providing real time contextually relevant content comprise a business trip, a personal trip, a family trip and a romantic trip and the like.

According to one embodiment herein, an important factor considered for a user on a family trip with kids is whether the hotel is kids friendly or availability of a kids playing area in the hotel etc. While for a user on a business trip, the important factor considered is the location of the hotel and the convenience of the user to meet people from that location. Thus, the contextually relevant content presented by the review analysis module 110 to the user on family trip comprises questions about the family friendliness of the hotel whereas, for the user on business trip, the questions are about the location, presence of Wi-Fi network at the location etc.

Similarly, location based contextually relevant content is also provided to the user. For example, in a place like Bali (in Indonesia) the speciality of hotels is the presence of wide range of amenities such as infinity pool whereas in Marrakech (in Morocco) the speciality of hotels is nicely decorated patios. For the user visiting Marrakech, the contextually relevant content presented by the review analysis module 110 to the user comprises questions such as "whether the hotel had a good patio?" The review analysis module further considers specialities associated with each hotel/location that the user is visiting while framing the questions. E.g. a user staying at a hotel that is famous for architecture and has a unique bar. Then, the review analysis module 110 provides relevant contextual content comprising of questions about the architecture of the hotel, weather the user got a chance to have a drink at the bar and the like.

The review analysis module 110 also analyses the sentiments of the user from the text written by the user in the review or from various images posted by the user. For example, when the user posts an image depicting a leaking ceiling of a bathroom or a broken window, then the sentiment analysis performed by the review analysis module 110 understands that the image represents a negative sentiment.

The review analysis module 110 further asks follow-up questions to the user based on what the user has shot (image), said or written. For example, when the user posts a photograph of dirty linen, the review analysis module 110 figures out that the linen is dirty and asks a contextual question such as "Is this how the linen has been provided by the hotel?" In case a user writes a negative review about any amenity (such as "I did not like the food"), the review analysis module 110 figures out that the user is expressing negative sentiment about food and asks more detailed questions about what in the food the user did not like such as service, food quality, longer waiting times, food not being fresh etc.

The user is provided with an option to include further details in the review or to finalize the review. The further details provided by the user is in any of the multimedia formats such as text, audio, video, and the like.

Once die user finalizes the review of the determined location, the review is published through the review publishing module 112. The consolidated review including all the changes and modifications is published by the review publishing module 112. The review-publishing module 112 complies the multiple reviews provided by the user for the same location and publishes as a single review. The consolidated review is in, a standard multimedia format (For example, in the form of text, audio or video). According to an embodiment herein, the consolidated review includes combination of various types of multimedia.

For example, a user records a review in plurality of formats e.g. text, audio and video. The machine learning algorithms perform an analysis of the reviews and create a summary of all the information that the user tries to convey through the plurality of formats. The summary thus created is made available in a single multimedia format or in a combination of multimedia formats such as text, audio and video.

According to one embodiment herein, the review publishing module 112 allows the user to review the same location multiple numbers of times. The user is provided with an option to finalize the review of the location. The user is requested to re-review the location based on the information collected from a plurality of sources. Further, the review publishing module 112 allows the user to modify the published review at a later stage. The review-publishing module 112 creates one or more versions of the modified reviews for the same location. In another example, the review-publishing module 112 only creates a single version of the review.

Figure 2:
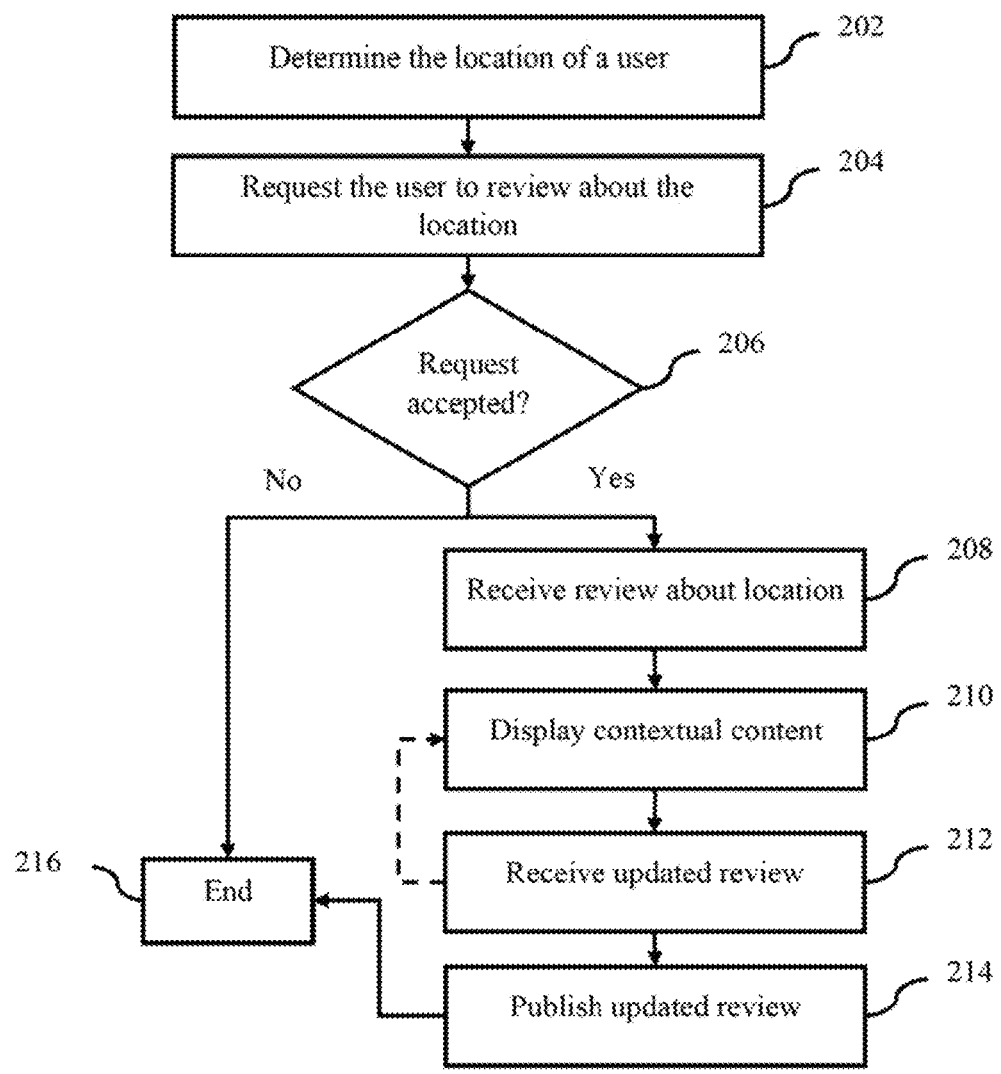
FIG. 2 illustrates a flowchart explaining the method for creating and publishing reviews, according to one embodiment herein.

FIG. 2 illustrates a flowchart explaining the method for creating and publishing reviews, according to one embodiment herein. For providing users to create and publish reviews, at first, the location of the user is determined (Step 202). The location of the user is determined through one or more location determination systems available in the computing device. The examples of the location determination systems include, but are not limited to Global Positioning System (GPS), satellite navigation systems, GLONASS, regional tracking systems, telecommunication network tracking, and the like.

Once the location of the user is determined, a request to review the location is pushed to the user through the application (Step 204). The request to review the location is pushed as a notification only when the determined location is present in a database of the application server. In another example, the request to review the location is pushed as a notification even when the determined location is not present in the database of the application server. According to an embodiment herein, the request to review the location is pushed as soon as the location is determined. According to another embodiment herein, the request to review the location is pushed after a predetermined delay to allow the user to experience the events at the determined location.

Further, an option to accept or decline the request to review the location is provided to the user (Step 206). The option selected by the user is communicated to the application server. According to an embodiment herein, when the user declines to review the determined location, the application is closed temporarily on the computing device (Step 216).

Once the user accepts the option to review the determined location, a chat-based interface to allow the user to create the reviews is launched in the computing device, through the dedicated application (Step 208). The user then creates the reviews about the determined location in various multimedia formats such as text, audio, video, or a combination thereof.

The created review is analysed using a plurality of technologies such as artificial intelligence, machine learning, sentiment analysis, historic reviews, knowledge gathered from other sources, and the like. According to an embodiment herein, based on the analysis computed on the initial review of the user, the user is presented with a contextual content (Step 210). The contextual content is presented in the form of a chat-based interface. The contextual content presented to the user in the form of the chat-based interface includes, but are not limited to suggestions to improve the created review, specific questions to fetch more information from the user, additional details that make the review more credible, and the like.

The user has to option to accept or decline the contextual content presented by the application. When the user declines to accept the contextual content presented by the application server, the review created by the user is marked as final and is published on the platform.

The user after accepting the request to re-review the contextual content presented, and adds or modifies the review, and then the review is updated and presented to the application server (Step 212). The user provides the updated review in through the chat-based interface provided by the application server. Further, the updated review is analysed and contextually relevant content is presented to the. The process of analysing and providing contextually relevant content to the user is iterated a predetermined number of times. For example, the contextually-relevant content is presented to the user twice, to receive the updated and modified review. In another example, the contextually relevant content is presented to the user thrice, to receive the updated and modified review.

Once the review is finalized, the updated review is published on the review-publishing platform (Step 214). The updated review includes the reviews created by the user in the entire possible multimedia format in another embodiment, the updated review includes the reviews created by the user in one of the multimedia formats. According to an embodiment herein, the review creation and publishing platform converts various multimedia formats to a desired single multimedia format. For example, when the user has reviewed the determined location using various multimedia formats such as text, audio, and video, the review creation, and publishing platform converts to a single multimedia format such as a text format.

Once the review is created and published, the process is ended (Step 216). According to an embodiment herein, when the process is completed, the application in the computing device closes.

Figure 3:
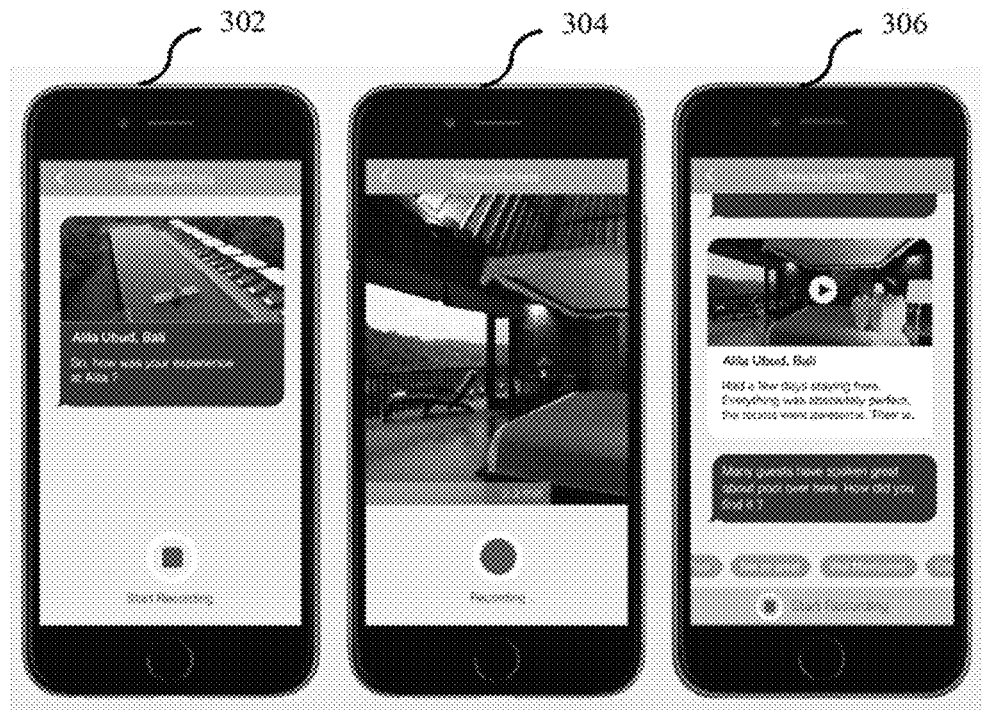
FIG. 3 illustrates a screenshot illustrating the process of review creation and publication, according to one embodiment herein.

FIG. 3 illustrates screenshots illustrating the process of review creation and publication, according to one embodiment herein. The screenshot 302 illustrates the request notification to review the determined location (Alila Ubud, Bali) in the chat-based interface. The screenshot 304 illustrates the user reviewing the determined location in a multimedia format (video and audio) in a chat-based interface. The screenshot 306 illustrates the review of the user converted to other multimedia format (text), and the application providing the contextually relevant content to the user in the form of a relevant question, in a chat-based interface. The user may wish to update the review based on the presented contextually relevant content or to publish the review.

According to an embodiment herein, the review publishing platform treats each of the users as unique and opinions that each user is having a different experience, for creating a dynamic questionnaire. For example, one of the users might be an adventurer and enjoys a solo trip, and another user might be travelling with his/her spouse, and yet another user might be travelling with family.

In a similar way, the review publishing platform treats each of the location as a unique point for creating a dynamic questionnaire. For example, one of the locations might have a good architecture, the other might have a good location, and another location might have a good view, and the like. Therefore, the questionnaire is also dependent on the type of the hotel, and other parameters of the hotel. Likewise, each amenity within the location also varies, and the review provided by the users on each amenity with respect to the location also varies. Therefore, the review publishing platform considers the above aspects for generating a dynamic questionnaire generation.

In an example, the review publishing platform might generate a question/opinion on the architecture of a hotel such as Leela Palace because that particular hotel is famous for the architecture.

In a similar way, when the review publishing detects that the user is travelling with the spouse, the dynamic questionnaire would be generated on topics such as user security and privacy, whereas when the platform detects that the user is travelling with the family, the dynamic questionnaire would be based on kid-friendly, elderly friendly topics.

Further, when the user does not review about the food in a hotel, or provide a negative review about the food where there are numerous reviews on food, the dynamic questionnaire generated by the review publishing platform is different compared to the dynamic questionnaire generated when the user provides a negative location review. The review publishing platform handles each of the cases differently, in a dynamic manner.

Therefore, the system and method for creating and publishing reviews of a determined location in a chat-based interface allows the user to create the reviews of the determined location spontaneously. The system and method presents contextually relevant content to the user based on the historic data available for the reviews. The system and method presents contextually relevant content to the user based on artificial intelligence and machine learning techniques. The system and method allows the user to update and modify the review based on the contextually relevant content presented to the user. The finalized review of the user is presented to other users through the review-publishing platform.

The system and method creates a common language for all medium of reviews e.g. text, image, audio, video. This allows the user created reviews in any of these multimedia formats to be converted to text format, which enables ease of consumption of reviews.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications arc deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. An interactive system for creating and publishing reviews about a location, the system comprising:
    an application server configured for enabling one or more users to create and publish one or more reviews about a selected location, and wherein the application server is communicatively coupled with a plurality of computing devices of the one or more users, and wherein the plurality of computing devices of the one or more users are configured for detecting real time geographical coordinates of a user location and for transmitting the detected real time geographical coordinates to the application server;
    a registration module provided in the application server and run on a hardware processor, and wherein the registration module is configured for registering the one or more users with the system based on one or more personal details provided by the user;
    a review creation module provided in the application server and run on a hardware processor, and wherein the review creation module is configured for enabling each user to create one or more reviews in a plurality of multimedia formats, and wherein the review creation module is further configured for providing an interactive chat based interface on the computing device of the user for creation of one or more reviews;
    a review analysis module provided in the application server and run on a hardware processor, and wherein the review analysis module is configured for analyzing the one or more reviews created by the user using one or more analysis techniques based on a plurality of pre-determined parameters, and wherein the review analysis module is further configured for providing a real time contextually relevant content to the user based on a type of a trip and the location, and wherein the contextually relevant content is provided to the user through the interactive chat-based interface upon analysis of the initial review provided by the user, and wherein the real time contextually relevant content comprises a suggestion, a specific question, a follow-up question, an improvement, a request for sharing additional details about any specific topic mentioned in the initial review based on the created initial review and an option to include further details in the review or to finalize the review, and wherein the contextually relevant content comprises a suggestion to improve the review created by the user, which is based on the predetermined analysis, and wherein the contextually relevant content is a specific question asked to the user based on the created initial review, and wherein the review analysis module is also configured to analyse the sentiments of the user from the text written by the user in the review or from various images posted by the user, and wherein the review analysis module is configured to direct the analysis to a concerned personnel when the analysis is not obtained through automation;
    a review publishing module provided in the application server and run on a hardware processor, and wherein the review publishing module is configured for publishing a consolidated/compiled review after combining one or more reviews provided by the user and after accommodating all the changes based on the analysis performed by the review analysis module, and wherein the review publishing module is further configured for publishing the consolidated/compiled review in a single multimedia format or in a plurality of multimedia formats, and wherein the plurality of multimedia formats includes text, audio and video, and wherein the consolidated review includes combination of various types of multimedia;
    wherein the review analysis module is further configured for directing the user provided reviews to a concerned personnel for analysis when the one or more analysis techniques provided by the review analysis module are insufficient to analyze the reviews, and wherein the review analysis module is further configured to ask follow-up questions to the user based on the mage shot and posted or written, and wherein the review analysis module is further configured to analyse specialities associated with each hotel/location that the user is visiting while framing the questions; and wherein the review analysis module is further configured for providing an option to the user to accept or decline the real time contextually relevant content presented through the interactive chat-based interface for improving the one or more reviews, and wherein the initial review created by the user is marked as a final review and the final review is published when the user declines the presented real time contextually relevant content.

2. The system according to claim 1, wherein the plurality of pre-determined parameters considered by the review analysis module for analyzing the one or more reviews created by the user comprise previous reviews of the selected location, pre-set detail-oriented reviews about the selected location, a length of the review, emotion factor and quality of the review.

3. The system according to claim 1, wherein the type of trip considered by the review analysis module for providing real time contextually relevant content comprises a business trip, a personal trip, a family trip and a romantic trip.

4. The system according to claim 1, wherein the computing device of the user is further configured for determining a real time location of the user using one or more location determination systems.

5. The system according to claim 1, wherein the application server is further configured for pushing a notification to the user requesting to review the selected location on receiving real time geographical coordinates of the user location from the computing device, and wherein the user is provided with an option to accept or decline the review request, and wherein the interactive chat based interface is launched on the computing device of the user for providing review on accepting the request to review the determined location.

6. The system according to claim 5, wherein the application server is further configured for pushing the notification request on the computing device of the user to review the location after a predetermined delay from the time of receipt of the geographical coordinates of the user location.

7. The system according to claim 1, wherein the system is further configured for enabling the one or more users to review same location for a plurality of times.

8. The system according to claim 1, wherein the system is further configured for enabling the one or more users to modify the published review at a later stage or period.

9. The system according to claim 1, wherein the one or more analysis techniques used by the review analysis module for analyzing the one or more reviews provided by the user comprise a machine learning algorithm, an artificial intelligence algorithm, a sentiment analysis, a contextual analysis, a location-based analysis and a behavioral analysis.

10. The system according to claim 1, wherein the system is further configured for providing a browser application, a mobile application or a software package hosted on the computing device of the user for creating and publishing one or more reviews about the location.

11. A computer implemented method comprising instructions stored on a non-transitory computer readable storage medium and, run a computing device provided with a hardware processor and memory for creating and publishing reviews about a location, the method comprising the steps of:
registering one or more users with the system through a registration module using one or more personal details provided by the user;
detecting real time geographical coordinates of the user location and transmitting the detecting real time geographical coordinates to an application server;
pushing a notification on the computing device of the user by using the application server for requesting the user to review the determined location;
enabling the user to create one or more reviews in a plurality of multimedia formats by providing an interactive chat based interface on the computing device of the user for creation of one or more reviews using a review creation module;
analyzing the one or more reviews created by the user based on a plurality of pre-determined parameters using one or more analysis techniques through a review analysis module;
providing a real time contextually relevant content to the user based on a type of trips or the location using the interactive chat-based interface for improving the one or more reviews based on the analysis of the initial review provided by the user; and
publishing a consolidated/compiled review using a review publishing module after combining one or more reviews provided by the user and after accommodating all the changes based on the analysis performed by the review analysis module;
wherein the review analysis module is further configured for directing the user provided reviews to a concerned personnel for analysis when the one or more analysis techniques provided by the review analysis module are insufficient to analyze the reviews, and wherein the review analysis module is configured to direct the analysis to a concerned personnel when the analysis is not obtained through automation, and wherein the real time contextually relevant content comprises a suggestion, a specific question, a follow-up question, an improvement, a request for sharing additional details about any specific topic mentioned in the initial review based on the created initial review and an option to include further details in the review or to finalize the review, and wherein the contextually relevant content comprises a suggestion to improve the review created by the user, which is based on the predetermined analysis, and wherein the contextually relevant content is a specific question asked to the user based on the created initial review, and wherein the review analysis module is also configured to analyse the sentiments of the user from the text written by the user in the review or from various images posted by the user, and wherein the review analysis module is further configured to ask follow-up questions to the user based on the mage shot and posted or written, and wherein the review analysis module is further configured to analyse specialities associated with each hotel/location that the user is visiting while framing the questions, and wherein the review analysis module is further configured for providing an option to the user to accept or decline the real time contextually relevant content presented through the interactive chat-based interface for improving the one or more reviews, and wherein the initial review created by the user is marked as a final review and the final review is published when the user declines the presented real time contextually relevant content, and wherein the review publishing module is further configured for publishing the consolidated/compiled review in a single multimedia format or in a plurality of multimedia formats, and wherein the plurality of multimedia formats includes text, audio and video, and wherein the consolidated review includes combination of various types of multimedia.

12. The method according to claim 11, further comprises allowing the one or more users to review same location for a plurality of times.

* * * * *